Patented Mar. 14, 1933

1,901,325

UNITED STATES PATENT OFFICE

EMIL E. NOVOTNY, OF PHILADELPHIA, PENNSYLVANIA, ASSIGNOR TO JOHN STOGDELL STOKES, OF HUNTINGDON VALLEY, PENNSYLVANIA

ABRASIVE BODY AND METHOD OF MAKING THE SAME

No Drawing.   Application filed September 6, 1929.   Serial No. 390,848.

This invention relates to the manufacture of various articles of bonded granular abrasive material such as grinding wheels, discs, segments, blocks, etc., wherein a normally dry and fusible synthetic resin is applied in such dry state as a solid homogeneous surface coating for the abrasive granules by applying such synthetic resin coating to the heated resin granules or while such resin is heated. Such resin coatings being subsequently wetted with preferably a sticky, tacky adhesive product to provide a foundation for a further layer of fine, pulverized, fusible, synthetic resin. This wetted or adhesive surface providing the necessary bond for the composition while being pressed in unheated molds at elevated pressures.

The chief object of my invention is to provide a method whereby various synthetic resins of a dry, non-sticky nature may be directly coated upon the exposed faces of abrasive granules in order that a strong, rigid bond of unaltered synthetic resin will be provided in close proximity to such abrasive surfaces. Under normal conditions a dry-non-sticky synthetic resin will not adhere to abrasive grain surfaces and, therefore, a uniform coating cannot be satisfactorily applied. It has been proposed to utilize a synthetic resin solvent for the purpose of preliminarily moistening such abrasive grains, but the use of such solvent leaves porous voids or non-descript resinous masses which are to be avoided. I have found that by heating the abrasive grain to a temperature of from 180 to 200° F. and then by introducing a normally dry, hard synthetic resin product which may be either pulverized or in lumps and which has a softening or melting point at this temperature, it is possible to thoroughly and uniformly coat the exposed faces of the abrasive granules with such pure solid and homogeneous synthetic resin product which is very low in volatile constituents.

In my copending application, Serial No. 382,583, filed July 31, 1929, I have disclosed a method whereby abrasive granules when preheated may be coated with a dry and normally solid synthetic resin product. The materials and methods described therein are useful for the purpose disclosed herein. I have found, however, that it is preferable to provide a wetting agent for the synthetic resin body, whereby the synthetic resin mixture will be sufficiently dry to permit of the compound being broken up into loose granular particles as by being passed through a sieve, but, on the other hand, provide a mass which through the wetting agent may be bonded under pressure in unheated molds to the desired shape, such bond being sufficiently firm to permit the removal of the formed object from the mold and to retain the shape of such object when subsequently heated at elevated temperatures over a prolonged period of time until the hard, set and ultimate product is obtained.

For this purpose I may utilize various synthetic resins of either the phenol type such as those formed from a phenolic body and an aldehyde as, for example, bodies having the reactive methylene group or bodies made of furane derivatives or resins made of aldehyde derivatives such as hexamethylenetetramine, furfuramid, etc., or combined with various alcohols such as glycerine or, for that matter, resins of the glyptal type, that is, reaction products of a polybasic acid and a polyhydric alcohol or, for that matter, other suitable fusible, thermo-reactive resins such as those made of urea and its derivatives such as thiourea, those made of vinyl compounds, etc. Although the preference for most types of abrasive wheels is for resins of the phenol methylene type, inasmuch as such bonding material placed directly against the surfaces of the abrasive granules produces a sharp cutting, snappy type of abrasive, the resins of the glyptal type are very suitable for the preliminary coating operation inasmuch as these resins adhere tenaciously to the surfaces of the abrasive material and for that reason a product high in mechanical strength may readily be produced. Although it is not necessary to add any solvents with these resinous bodies and preferably I do not advise the use of such solvents, it is to be understood that moderate quantities of solvents, particularly those of the high boiling type, may be used in the form of plasticizing agents should a modified type of resin product be required. These modifying agents may be of a liquid, semi-liquid or solid nature and may be solvents of the resins or may be merely mechanical mixtures therewith. Among such plasticizers we may mention china wood oil, dibutyl phthalate, metallic soaps, and oleates such as oleic acid. The use of such solvents, however, is not essential to provide a satisfactory coating for the resin granules, and the use of a solvent for this purpose is not recommended as the heated abrasive grains may be readily and uniformly coated with a fusible resin under the conditions given herein.

For some purposes it is desirable to use mixtures of two or more types of synthetic resin either for the preliminary coating or for the wetting agent or for the final pulverized resin subsequently added.

For the wetting agent I prefer to use liquid synthetic resins and these products are usually of the phenol aldehyde type. In my copending application, Serial No. 390,426, filed September 4, 1929, I have described in detail the production of such liquid resinous materials and the method of using the same. I have also therein briefly described the methods claimed in this case. It is to be understood, however, that as this method provides a means for the application of a homogeneous resin of great strength on to the surfaces of the abrasive material through the use of solid, fusible products, I am therefore not limited to merely the use of liquid resins or various liquid adhesives such as those of dextrine, starch, sodium silicate, Canada balsam, etc., but I may wet such resin surfaces through the use of a small quantity of resin solvent such as the alcohols, ethyl, methyl, furfur, etc., or through the use of various aldehydes such as furfural, benzaldehyde, butyl aldehyde, paraldehyde, etc. The use of such resin solvents, however, is not necessary and my preferred choice is to introduce a suitable amount of a liquid synthetic resin as the wetting agent.

Briefly, my product and method comprise the steps of

1. Coating the granular material while hot with a small quantity of synthetic resin which is substantially solid at room temperatures. Such granular material being preferably heated at from 180 to 200° F. For most purposes it is preferable to apply a substantial coating on such faces as through the use of 5% of the weight of the abrasive grains in dry synthetic resin. Such coated granules may be retained in stock for future use and individual size grains may be coated separately in preparation for future use, whereby a greater uniformity of coating may readily be obtained. The product has unlimited keeping qualities and may be kept in stock on hand for future use over a period of years.

2. Preferably after the mass has resumed its normal temperature applying a suitable wetting agent to such coated abrasive grains. This coating is preferably obtained through the use of a liquid synthetic resin product and the mixing is most advantageously done after the mixture of various size grains entering into an abrasive compound has been weighed out and deposited into a batch mixing device. The wetting agent used is less than the weight of dry resin used; and where the total weight of dry resin is less than 17% of the weight of the abrasive grain, the wetting agent is from .2% to 5% of the weight of the abrasive granules.

3. While wet and preferably while being stirred in the mixing device adding the balance of dry pulverized resin to such mix. Where 5% of the dry resin had been used as a direct coating applied to the surfaces of the abrasive grains and wherein 17% of dry resin is to be added, the dry powder addition under such conditions would be to the extent of approximately 12% in weight of such abrasive granules.

4. Distributing the wetted cohesive but substantially dry granules in a mold cavity, leveling the charge within said cavity and forming the product preferably in unheated molds.

5. Removing the formed object while cold and placing the object on suitable racks awaiting oven treatment. The product may be kept in this condition for a period of months without undergoing changes.

6. As required, the formed abrasive body is placed into a suitable mold and heated at gradually increasing temperatures as at from 212° F. increased to 350° to 500° F., if necessary, depending upon the type of resin bond used, over a period of time of from 2 hours to 3 days. This hardening is well understood and under ordinary conditions a hardening cycle of 51 hours is generally used, the end temperature being approximately 400 to 450° F. The product is now gradually cooled and has been hardened to its final, ultimate, hard, set and infusible form.

In order that my invention may be better understood, I am giving the following illustrative example:

Provide a suitable mixing device such as is used in making abrasive wheel compositions which may be arranged for heating and cooling as by having been jacketed for the admission of steam and for the admission of cooling water but which need not necessarily be so. The purpose of this jacket is to permit the heating of the abrasive granules to a temperature of from say 180 to 200° F., depending, of course, somewhat upon the softening point of the resin to be used as a coating and upon the mixture which may generate some heat during the mixing operation. On the other hand the mixer may be kept normally cold or may be cooled continuously as through the admission of cooling water into the jacket and the abrasive grains may be heated preliminarily in an oven and it will be found that such heating will be sufficient for the purpose of coating the grain surfaces with the dry, fusible, potentially reactive synthetic resin. Another optional method is to heat the resin mass to a temperature of say 250° F. and introduce such mass in a molten state into either farmed or cooled abrasive granules. Such method, however, may offer technical difficulties inasmuch as some resins may be potentially reactive at these high temperatures and, therefore, great precautions are necessary in handling the process in this manner. Whatever optional method has been used, I preferably place into the mixing device a sufficient quantity of synthetic resin product which may be finely ground but need not necessarily be so. This synthetic resin is introduced in a quantity sufficient to properly coat the granules or in a quantity of say 5% of the weight of abrasive granules contained in the mixing device. By operating the mixer for a period of from 5 to 10 minutes, the abrasive granules will be thoroughly coated and cooling water may then be admitted to cool the mass down to room temperatures.

By using an ordinary dough mixer it is possible to introduce 1000 pounds or more of abrasive grain of one size which may be preliminarily coated with say 5% of its weight with a dry synthetic resin and it will be found that such abrasive grain if stirred while cooling will separate to its individual granule size with every portion of the surface thoroughly and uniformly coated. Such coated material may be placed in stock bins in ready-to-use form.

When a mix is to be made which usually consists of abrasive granules of varying sizes, such mixture is placed into an individual batch mixing device and if the resin so used has already been coated as previously described, the heating and coating operation may at this point be dispensed with. To the coated grains and on the basis of the net weight of abrasive grains I preferably add a suitable synthetic resin liquid or semi-liquid at room temperatures. This is preferably added to the extent of about .2% to 5% of the net weight of abrasive grains used. The mixer is operated for a period of about 5 minutes to thoroughly wet such granules. Where 5% of the abrasive weight in dry resin has been used for the coating operation and where the usual #16 silicon carbide abrasive grain is to be used in the production of a soft center for a 24" abrasive wheel, I would add 1.5% of the weight of abrasive in liquid resin having a Stormer viscosity of 180 at 77° F. Preferably while the mixer is in operation I would add the balance of the resin required or 4.6% of the net weight of abrasive granules in a dry, fine, powdered synthetic resin. The mixing is continued for a period of about 5 minutes or until the dry resin is sufficiently wetted and attached to the abrasive grains.

The product should be relatively dry or sufficiently so that it may be readily broken up into small particle sizes as by being passed through a suitable sieve but sufficiently moist that it is capable of forming coherent masses when being subjected to pressure.

The mass is now placed into a suitable mold cavity and a pressure of from 500 to 2000 pounds to the square inch is applied, thus forming the object to the desired shape. The wetting of the resin granules should provide sufficient cohesion to maintain such formed body in the desired shape and the mass should be sufficiently dry so that there will be no adhesion to the mold surfaces when the mold surfaces are cold.

The formed object is now ready for hardening, which may be carried out as by treating in a suitable oven in the well known manner.

For the production of abrasive wheels of varying grain sizes, the proportion of total resin will vary somewhat inasmuch as a finer grain size will require a greater proportion of resin than will a coarser grain size or, stated otherwise, the proportion of resin used varies directly with the surfaces of the abrasive grains composing the mixture. Furthermore, the total resin used will vary roughly from 10 to 25% of the abrasive granules used, depending upon the hardness of the abrasive object to be produced. A tougher and harder abrasive object may be produced through the increase in the proportion of resin bond. During the summer months when room temperatures are relatively high, the percentage of wetting agent may be somewhat lower than the percentage of wetting agent necessary during winter months when room temperatures in operating departments are in the neighborhood of 60 to 70° F.

To more clearly illustrate the proportions preferred by the writer for each of the coating operations, the following tabulation is given, based upon the weight of abrasive grains taken as 100%, when the weight of synthetic resin for the coatings would be approximately the percentages given:

*Resin used as percentage of net weight of abrasive*

| Kind of abrasive wheel | Operation | | | Total resin |
|---|---|---|---|---|
| | 1 Coating | 2 Wetting | 3 Final layer | |
| 24″ soft center using No. 16 silicon carbide | *Per cent* 5.00 | *Per cent* 1.50 | *Per cent* 4.60 | *Per cent* 11.10 |
| 10″ standard using No. 20, 24, 30 and 36 silicon carbide | 5.00 | 2.68 | 8.03 | 15.71 |
| 12″ x ⅛″ cutting off wheels using silicon carbide of varying sizes, finest being 60 mesh. Summer mixture | 5.00 | 1.90 | 12.17 | 19.07 |
| 12″ x ⅛″ cutting off wheels using silicon carbide of varying sizes, finest being 60 mesh. Winter mixture | 5.00 | 2.30 | 11.77 | 19.07 |

Although these example are given for use in bonding silicon carbide abrasive granules, it is to be understood that other abrasive material may be used as, for example, aluminous oxide or various other synthetic abrasive products or, for that matter, natural abrasives such as flint, garnet, emery, etc. Where such abrasive materials are relatively more porous than the silicon carbide given by example, it is to be understood that the proportion of liquid resinous material used is to be increased sufficiently to provide the necessary tackiness to the entire mix to eliminate, as far as possible, loose, un-suspended synthetic resin particles and to provide a sufficient bond when the product is cold pressed in the dies.

The proportion of various sizes of abrasive grains and the admixture of various abrasives differ somewhat in the various plants where abrasive bodies are made, and, for this reason, no exact proportion of liquid coating material to the proportion of dry pulverized synthetic resin used or to the proportion of granules used can be given. The balancing of these proportions, however, is a very simple matter inasmuch as the surfaces of the synthetic resin should be wetted just sufficiently to bond such pulverized resin without having an undue amount of loose, dry powdery resinous material in the mass and, at the same time, have a mass which may readily be broken up into small lumps or particle sizes. This breaking up of the mass into small lumps or individual abrasive particles as by passing the mass through a relatively coarse sieve having a mesh of about 6 enables the uniform leveling of the composition in the mold, whereby the dynamic balance of the molded piece such as an abrasive wheel may be obtained with exactitude. The wetness of the mass, however, should not be so great as to produce a sticky molded article in the mold as such product is difficult to remove from the mold unless the mold be previously coated with a wax or with a paper facing. If the granules are too wet and therefore form sticky, tacky molded articles, the proportion of liquid resin or other liquid adhesive material should be reduced, or else provision should be made to cool the mold during the molding operation to sub-normal temperatures.

The glycerine-phthalic anhydride type of resins as representative specifically of the polybasic acid-polyhydric alcohol type of resins produces very satisfactory products only that when used alone as the principal bonding ingredient the resinous mass tends to smear the work particularly where such abrasive is used for surfaces and for polishing.

Where such abrasive is used for cutting off wheel purposes this objection is not so serious. By utilizing the straight liquid form of resin of this type as, say, the glycerine-phthalic anhydride liquid resin without admixture with phenol resins and applying such resin directly upon the faces of the abrasive grain, I am enabled to secure an exceptionally strong bond for the powdered synthetic resin subsequently added to the mix which may be any suitable synthetic resinous substance as, for example, phenol-formaldehyde or phenol-furfural condensation products. By utilizing the glyptal type of resin as a bond for the grain, it will be found that the glyptal resin wets the surface to better advantage than does the liquid phenol-formaldehyde resin. I am thus enabled to use two different types of resins, one for the immediate bonding or coating agent against the surface of the abrasive grain, and the other furnishing the bond for such coated surface. The phenol-formaldehyde resins bond to very good advantage with the glyptal type of resin and therefore a product of utmost strength and durability, having long wear qualities and capable of standing high temperatures is produced.

In the use of these other resins such as those of the glyptal type for the first bonding agent, the proportion of wet resinous material to abrasive grains and to the weight of the dry synthetic resin used may be about the same as given in the preceding examples and depends also upon the viscosity of such liquid resin and the room temperature prevailing when such mixing and pressing is done. The keeping qualities of these glyptal resins are also very good and the mass will therefore retain its required consistency for a considerable length of time.

In the production of liquid synthetic resins of the phenol-formaldehyde type it is preferable to utilize phenol crystals of the U. S. P. grade although, of course, various cresols, xylenols or other higher phenolic bodies may be used either alone or in admixture with each other. It is, however, desirable to produce a product which will not boil and bubble unduly when being heat treated in order to convert the same into its ultimate infusible form. It is also highly desirable that such product should be low enough in viscosity so as to cover the abrasive granules without an undue expenditure for power in operating the mixing device. I find the following formula to be most suitable for my purpose:

| | Ounces |
|---|---|
| Phenol, U. S. P. | 32.00 |
| Formaldehyde, commercial | 35.00 |
| H₂O | 17.00 |
| NaOH, previously dissolved in water in the ratio of 1 part to 10 parts of water; solution used by weight | 1.28 |

The product is placed into a suitable kettle provided with a jacket for heating and for cooling and provided with a suitable stirring device. The mixture is boiled under a reflux condenser for a period preferably of 2 hours and 30 minutes. The mass is then cooled to room temperature and the watery layer on the top of the mass is discarded. The mass may now be allowed to settle to eliminate any further water which may be occluded therewith. A small amount of water mixed with the mass does not greatly interfere with the use of the product although the inclusion of a large amount of water with such resinous mass will produce abrasive bodies weak in tensile, transverse and deflection strengths. I therefore find it preferable to eliminate water of solution where the liquid resin is to be used in the production of high grade, strong bodies.

As it is preferable to keep the viscosity of the liquid resin as low as possible, it is not desirable to distill the water from the mass and most particularly not at atmospheric pressures, and it is, furthermore, not desirable to practice steam distillation for the same reason.

To produce a still purer product which will contribute to the ultimate strength of the abrasive objects, I prefer to wash the liquid resinous condensation product in several changes of water so as to eliminate free phenolic bodies should any remain therein.

This liquid resinous material is a one-stage phenol-formaldehyde condensation product wherein substantially all of the phenolic bodies have been combined with substantially all of the aldehyde. This product is potentially reactive and capable of assuming a hard, set and infusible form without undue bubbling, gassing, etc. which would be ruinous for the purpose inasmuch as such finely hardened abrasive bodies made with this material would either be weak in strength or would be badly blistered, warped, etc.

Wherein I have laid particular stress upon the use of a liquid resin free from impurities and solvents, it is to be understood that for certain purposes I can utilize solid resins which have been previously cut or dissolved in suitable resin solvents prior to the introduction of such products into the abrasive mixture. For these solvents I can use the alcohols such as ethyl or furfur alcohol or I may use the aldehydes such as furfural, benzaldehyde, etc. It is further to be understood that I may add hardening agents such as hexamethylenetetramine to the single stage resin if a faster reaction in the ovens is desired, and that I may even make a two stage resin utilizing a hardening agent such as furfural, furfuramid or hexamethylenetetramine to carry the reaction product over to its infusible stages. I may also produce liquid resinous bodies wherein formaldehyde, furfural, hexamethylenetetramine or trioxymethylene have merely been loosely combined with the resinous product and which, upon heat treatment in the ovens, will be converted to the higher polymerized and final form of product. Likewise, a solution or mixture of such ingredients with various phenolic bodies could be used as a preliminary wetting agent, the resinifying reaction and the subsequent hardening thereof taking place in the abrasive wheel itself.

While my preferred method contemplates the use of a liquid adhesive such as a liquid resin at room temperatures to be mixed with the resin coated abrasive granules prior to the introduction of the dry, fine pulverized synthetic resin, it is to be understood that I may likewise first mix the dry pulverized synthetic resin with the wetting or adhesive agent in order to thoroughly coat such resinous granules with such adhesive or wetting agent and that such wetted body may subsequently be placed into the mixer containing the previously resin coated abrasive granules, whereupon the wetted mass of resin granules will be distributed upon the resin surface of such abrasive grains.

Wherein I have particularly shown the use of liquid synthetic resin adhesives, it is to be understood that dextrine paste, sodium silicate adhesive, various waxes including chlorinated naphthalene may be used in approximately the same percentages as that given for the liquid synthetic resin adhesive and that the procedure may be carried out in exactly the same manner. Upon subsequent hardening, it will be found that the dextrine paste, for example, has been converted to a charred cellulosic product which will offer no binding qualities but the molten resin suspended or held by the dextrine paste will take its place during this final heat treatment. The charred cellulose will act as an absorbent of gases, tending to eliminate blistering.

Commercial tests have shown that it is not necessary to always use for the purpose of coating the abrasive granules a quantity, say equivalent to 5% of the weight of such abrasive granules to be coated. As a matter of fact, some variation may be practiced inasmuch as some abrasive materials may have a relatively high index of absorption while, on the other hand, the amount of coating necessary varies proportionately with the exposed surfaces in such mix. Generally, however, 5% as given of the weight of the abrasive granules is a very satisfactory amount of coating resin to use. Under some conditions, however, and most particularly where two different types of resins are used, it may be found desirable to utilize a minimum of say 1% and a maximum of 10% in resin weight of the total weight of abrasive granules. As high grade abrasive bonded wheels utilizing coarse abrasive granules can be made with a percentage lower than 10% of total resin bond, it is to be understood, therefore, that it is not always necessary to apply the secondary coating of powdered resinous particles but that for some purposes the coating, which in that case would represent the total dry resin content, can readily be applied as a direct surface coating to the resin particles and that a small percentage of wetting agent or liquid synthetic resin is to be added to this mixture for the purpose of wetting the surfaces of the resin in order to provide an adhesive medium when such mixture is pressed in cold molds.

The wetting agent as, for example, a suitable adhesive but preferably a liquid synthetic resin should be used to the extent of from .2% to 5%, which quantity will be found sufficient to provide the necessary bonding qualities. It is most desirable to maintain the liquid resin proportion as low as possible, dependent, of course, upon the character of work being molded.

The total dry resin as a percentage of the total weight of abrasive granules varies from 10 to 25%, and as it is expensive and laborious to grind such resin to a fine pulverized product of 200 mesh or finer it is advantageous to maintain the dry resin layer within the lowest possible limits. In some cases it is possible to eliminate the use of this layer inasmuch as the dry resin may be applied in total as the preliminary coating for the abrasive surfaces. Less than 1% and not over 20% of this fine, pulverized, dry, granular resin should be used in the final resin application calculated upon the net weight of abrasive granules used in the mixture.

My method offers several important advantages, among which may be mentioned that it is possible to provide a preliminary resin coating which has long keeping properties and which permits the application of a uniform layer of resinous material on to the surfaces of the abrasive grains and in closest proximity to such abrasive surfaces. The product may be kept on hand for an unlimited period of time at room temperatures. It is not necessary to use a fine pulverized resin for this purpose inasmuch as such fusible resin need be only coarsely ground or may be used in small lumps as the heating of the abrasive grains or the methods of the process cause such resin to fuse on to the faces of the abrasive grains without depending upon the use of a finely pulverized product. This eliminates considerable expense. On the other hand, it is possible to provide a composite layer-like bonded product utilizing a particular type of resin or a mixture of resins for each of the three coating operations. Thereby I am enabled to provide an abrasive body having the desired strength, flexibility, etc. together with the required freedom of cutting by suitable manipulation within these combinations. I have found that a composite layer-like structure has greater flexibility than a solid, homogeneous, resinous structure utilizing but one type of resin. In addition to mixing various types or compositions of resins, I am enabled to vary the hardness, melting point, reactivity, etc. of the various resins to suit the particular requirements. For example, I have found it to be preferable, in order to relieve stresses and strains, to utilize a resinous product having greater reactivity near the surface of the abrasive grains and having less reactivity within the center or the space occupied by the liquid resin applied in the wetting operation.

It is to be understood that I do not limit myself to the precise details of operation or proportion in my composition or methods inasmuch as wide departures and variations may be made without departing from the spirit of the invention or the scope of the appended claims.

What I claim is:—

1. A composition for the production of abrasive bodies comprising, abrasive grains having dry surfaces, said surfaces coated with a dry and fusible synthetic resin, the resin surface being wetted and provided with a normally dry, fusible, reactive pulverized synthetic resinous layer while the abrasive granule faces are substantially dry.

2. A composition for the production of abrasive bodies comprising, abrasive grains having dry surfaces, said surfaces coated with a dry and fusible synthetic resin, the resin surface being wetted and provided with a normally dry, fusible, reactive pulverized synthetic resinous layer while the abrasive granule faces are substantially dry, said composition formed into shaped abrasive bodies.

3. A composition for the production of abrasive bodies comprising, abrasive grains having dry surfaces, said surfaces coated with a dry and fusible synthetic resin, the resin surface being wetted and provided with a normally dry, fusible, reactive pulverized synthetic resinous layer while the abrasive granule faces are substantially dry, said composition formed into shaped abrasive bodies and converted at elevated temperatures to an ultimate hard, strong and tough abrasive body.

4. A composition for the production of abrasive bodies comprising, abrasive grains having dry surfaces, said surfaces coated with a dry and fusible synthetic resin, the resin surface being coated with a sticky synthetic resinous material.

5. A composition for the production of abrasive bodies comprising, abrasive grains having dry surfaces, said surfaces coated with a dry and fusible synthetic resin, the resin surface being coated with a synthetic resinous material and provided with a normally dry, fusible, reactive pulverized synthetic resinous layer while the abrasive granule faces are substantially dry.

6. The herein described method of making a synthetic resin bonded abrasive body comprising, coating the surfaces of the abrasive granules while warm with a dry, solventless and fusible synthetic resin and subsequently coating the resin surfaces with a sticky material, the said sticky coating being provided with a normally dry, fusible, reactive pulverized synthetic resin.

7. The herein described method of making a synthetic resin bonded abrasive body comprising, coating the surfaces of the abrasive granules while warm with a dry, solventless and fusible synthetic resin and subsequently wetting the resin surfaces with a tacky material, the said tacky material being provided with a normally dry, fusible, reactive pulverized synthetic resin, placing the composition in a mold cavity and leveling the composition therein and forming the composition to the shape of the mold cavity.

8. The herein described method of making a synthetic resin bonded abrasive body comprising, coating the surfaces of the abrasive granules while warm with a dry solvent free and fusible synthetic resin and subsequently wetting the resin surfaces with a suitable material and also wetting the surfaces of a dry, powdered synthetic resin therewith.

9. The herein described method of making a synthetic resin bonded abrasive body comprising, coating the surfaces of the abrasive granules while warm with a dry and fusible synthetic resin and subsequently coating the resin with a liquid-like resinous phenolic condensation product and also wetting the surfaces of a dry, powdered synthetic resin therewith, placing the composition in a mold cavity and leveling the composition therein and forming the composition to the shape of the mold cavity.

10. The herein described method of making a synthetic resin bonded abrasive body comprising, coating the surfaces of the abrasive granules while warm with a dry and fusible synthetic resin and subsequently coating the resin with a liquid-like resinous phenolic condensation product and subsequently wetting the surfaces of a dry, powdered synthetic resin therewith, placing the composition in a mold cavity and leveling the composition therein and forming the composition to the shape of the mold cavity, removing the formed abrasive body from the mold and heating said abrasive body to convert the same by gradually increasing temperatures to an ultimate hard and set abrasive body.

Signed at Philadelphia, in the county of Philadelphia and State of Pennsylvania this 4th day of September A. D. 1929.

EMIL E. NOVOTNY.